United States Patent [19]

VanDenberg

[11] Patent Number: 5,683,098
[45] Date of Patent: Nov. 4, 1997

[54] SUSPENSION SYSTEM AND ALIGNMENT MECHANISM THEREFOR

[75] Inventor: Ervin K. VanDenberg, Massillon, Ohio

[73] Assignee: Suspensions Incorporated, Canal Fulton, Ohio

[21] Appl. No.: 634,146

[22] Filed: Apr. 19, 1996

[51] Int. Cl.⁶ .................................................. B60G 11/26
[52] U.S. Cl. .................................................. 280/713; 280/711
[58] Field of Search .................................. 280/688, 698, 280/702, 713, 711, 725

[56] References Cited

U.S. PATENT DOCUMENTS

| | | | |
|---|---|---|---|
| Re. 30,308 | 6/1980 | Masser | 280/713 |
| 3,482,854 | 12/1969 | Masser | 280/124 |
| 3,960,388 | 6/1976 | Strader et al. | 280/693 |
| 4,261,597 | 4/1981 | VanDenberg | 280/688 |
| 4,595,216 | 6/1986 | Ware | 280/661 |
| 4,911,417 | 3/1990 | Short | 280/711 X |
| 5,002,305 | 3/1991 | Raidel | 280/711 |
| 5,403,031 | 4/1995 | Gottschalk et al. | 280/704 |

FOREIGN PATENT DOCUMENTS 0457962  11/1991  European Pat. Off. ............... 280/713

*Primary Examiner*—Christopher P. Ellis
*Attorney, Agent, or Firm*—Sand & Sebolt

[57] ABSTRACT

A suspension system for mounting to a vehicle frame includes a pair of stationary hanger brackets each formed with a compression plate and a pair of sidewalls. A movable hanger bracket is pivotally mounted on a pivot pin intermediate the sidewalls of the stationary hanger bracket, and a beam is pivotally mounted to each movable hanger bracket. An axle extends substantially perpendicular to the beams, and is rigidly attached thereto. An elastomeric bushing is positioned intermediate the movable hanger bracket and the stationary hanger bracket with a compression bolt extending therethrough. A nut threadably engages the compression bolt to draw the movable hanger bracket toward the compression plate thereby applying a compressive force to the elastomeric bushing. As the bushing compresses and the movable hanger bracket moves toward the compression plate of the stationary hanger bracket, the beam is similarly pulled toward the compression plate of the stationary hanger bracket thereby aligning the beam and interconnected axle with the vehicle path of travel. The compression bolt may be adjusted periodically as the trailer ages through use.

21 Claims, 4 Drawing Sheets

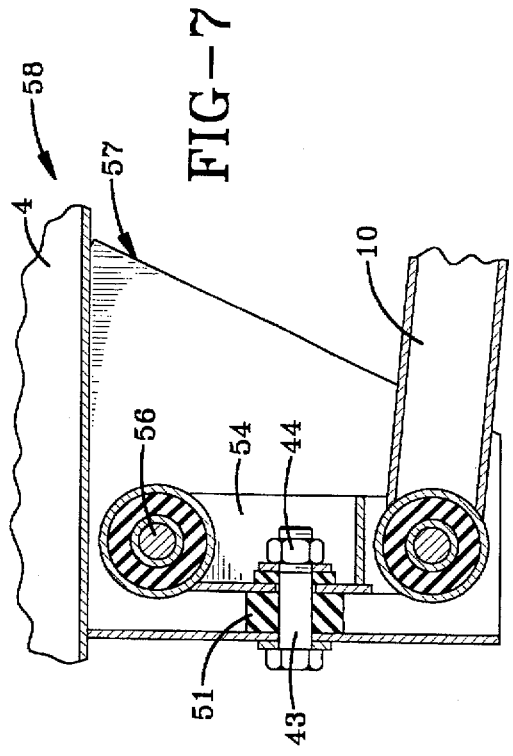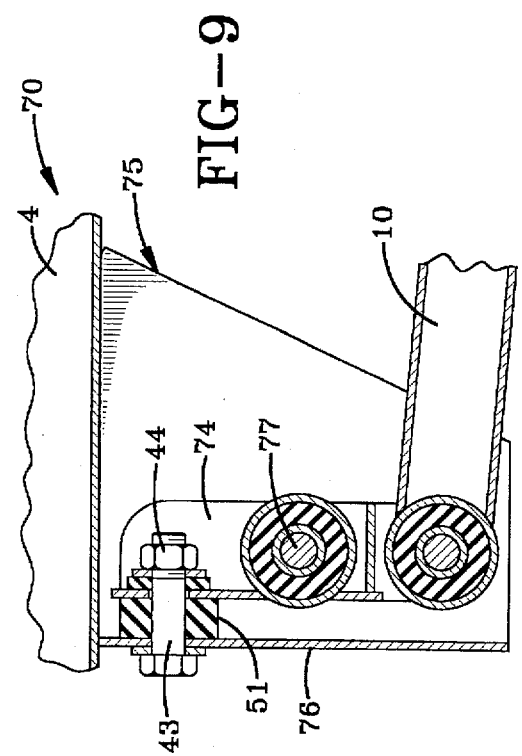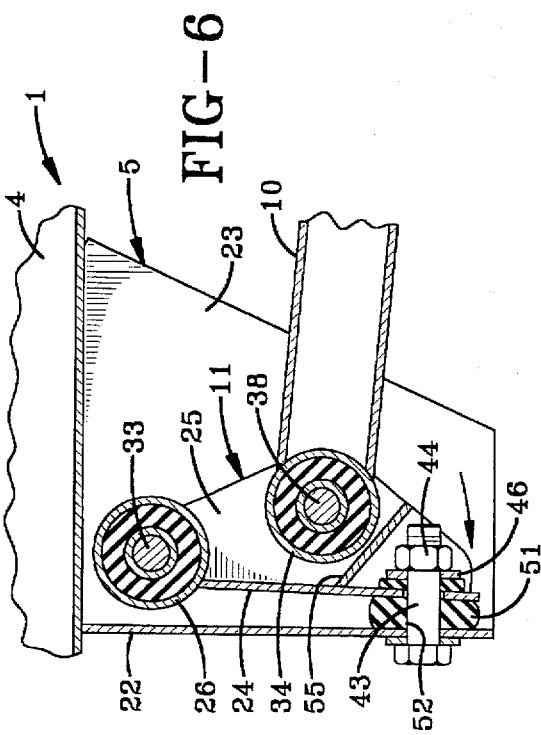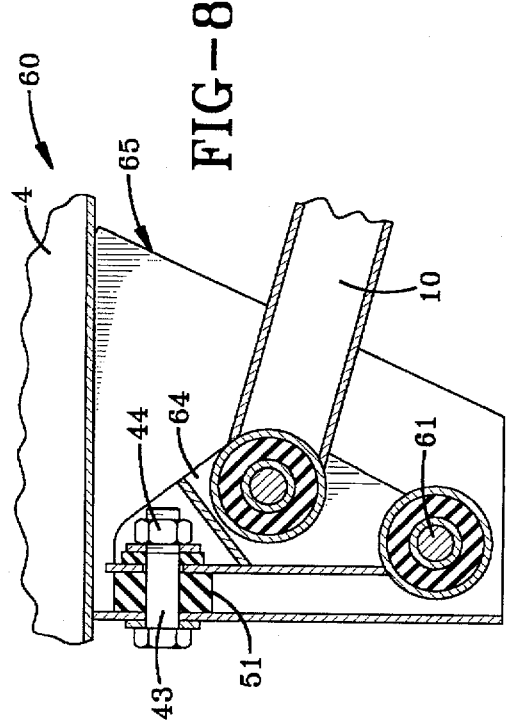

SUSPENSION SYSTEM AND ALIGNMENT MECHANISM THEREFOR

BACKGROUND OF THE INVENTION

1. Technical Field

The invention relates generally to an improved vehicle suspension system. More particularly, the invention relates to a vehicle suspension system with an improved alignment mechanism. Specifically, the invention relates to a mechanism for aligning an axle relative to the vehicle path of travel.

2. Background Information

The advent, following World War II of large load carrying capacity trucks and trailers in this country, created the need to provide a plurality of axles for increasing the capacity of trucks over that of the chassis-cab design which was manufactured with single front and rear axles. While multiple axles effectively increased carrying capacity, it was soon realized that as the number of load bearing axles increased on a given vehicle, a number of difficulties arose. Specifically, tire scuffing, loss in fuel economy and the inability to safely corner, all were problems associated with multiple axle vehicles. Mitigation of the these problems was, and continues to be, a primary concern of the industry which concern has resulted in the creation of a number of axle alignment mechanisms.

Trucks and trailers often employ suspension systems having trailing beams or rocker beams. Such suspensions generally include a longitudinally extending beam on both side of the vehicle which is pivotally connected at one end to a hanger bracket depending downwardly from the vehicle frame. The other end of the beam is generally associated with an inflatable air spring extending between the beam and the vehicle frame. The beams are generally parallel and spaced apart with an axle rigidly or resiliently attached to the beams and extending substantially normal thereto. One or more road engaging tires is then rotatably mounted on each end of the axle.

Most vehicles designed with the beam type suspension have a path of travel which is parallel to the frame rails extending longitudinally under the vehicle. For vehicles having only a front and a rear axle, the vehicle path of travel is generally defined by the parallel and spaced apart rear tires such that the direction of travel of the rear tires defines the path of travel of the vehicle. For vehicles having only a front and a rear axle, this path of travel is adequate and safe even if the rear tires are not positioned parallel with the vehicle frame rails. However, when multiple axles are utilized, the path of travel of each axle must be aligned with the line of travel of the remaining axles carried by the vehicle for safe economical vehicle operation. Specifically, if one axle is aligned with the longitudinal frame rails extending under the vehicle, and a second axle is offset relative to the longitudinal frame rails of the vehicle, as the vehicle moves over the road surface, one axle and its associated tire-wheel assemblies will track along the path of travel of the vehicle, while the second axle, which includes tire-wheel assemblies which do not rotate in a direction parallel to the path of travel of the vehicle, will drag under the vehicle increasing tire scuffing, tire wear, and creating a generally unsafe condition. When multiple axles are utilized, generally all tires affect the vehicle path of travel to some degree such that if one axle is offset relative to the vehicle path of travel, all tires will scuff, and drag under the vehicle. Additionally, as the tires are dragged along under the vehicle due to their misalignment, they continually add lateral forces to the suspension system, and consequently to the vehicle frame substantially reducing the lifespan of both the vehicle frame and suspension system components.

However, if the axles are aligned relative to the frame rails such that the tires rotate in a line parallel to the vehicle path of travel, the tire-wheel assemblies will rotate smoothly under the vehicle substantially increasing vehicle safety and vehicle performance as well as substantially increasing tire life.

For the above reasons, and specifically for safety and vehicle performance, it is necessary that each axle be carefully aligned with the vehicle, and with other load bearing axles carried by the vehicle to present a plurality of parallel and spaced apart tire-wheel assemblies for engaging the road surface and defining the precise direction of vehicle movement along the vehicle's path of travel. Such alignment is difficult for a number of reasons. Trailers as well as suspension systems may be manufactured out of tolerance, vehicle frame rails may not be perfectly parallel, and suspension systems may not be accurately mounted to the frame rails. These problems may be especially pronounced when suspension systems are added to existing equipment which may have experienced significant use.

Thus, to accommodate for the above inconsistencies in manufacturing and suspension system installation, an alignment mechanism may be included as part of the suspension system such that after the suspension system is installed on a vehicle, the axle may be moved relative to the vehicle to assure that the tire-wheel assemblies rotatably depending from the axle are substantially parallel to the vehicle path of travel. Axle alignment may be achieved by adjusting the axle mounting position relative to the parallel and spaced apart beams, or alternatively by adjusting the pivot point at which the beam is mounted to the hanger bracket.

While adjusting the axles relative to the beams is an adequate method of alignment, a number of problems are associated therewith. Specifically, such adjustment is often difficult to achieve as there is significant weight which must be moved up and down the beam to achieve the adjustment. Additionally, alignment of the axle relative to the beam often includes welding the mounting bracket to the beam after initial alignment. As such, it is difficult and expensive to realign the axle after the vehicle has been in service.

Similarly, previous alignment mechanisms which align the pivot point of the beam relative to the hanger bracket often required initial alignment of a collar within an elongated slot, which collar was welded in position after initial alignment. Once again, if the axle moved out of alignment, moving the collar previously welded to the hanger bracket is both difficult and expensive.

Thus, the need exists for an alignment mechanism which initially allows the axle to be aligned relative to the frame to assure that the tire-wheel assemblies rotatably depending from the axle are parallel to the vehicle path of travel. The need further exists for an axle alignment mechanism which will permit subsequent alignment of the axle relative to the vehicle frame without the need for cutting welds, or displacing the axle relative to the beams.

SUMMARY OF THE INVENTION

Objectives of the invention include providing a suspension system with an alignment mechanism for aligning an axle relative to a vehicle frame.

A further objective is to provide a suspension system with an alignment mechanism which permits both initial alignment of the axle relative to the vehicle, and subsequent alignment of the axle relative to the vehicle with relative ease.

Another objective is to provide an alignment mechanism which linearly displaces the pivotal connection between the beam and hanger bracket.

Still another objective of the invention is to provide an alignment mechanism for aligning an axle relative to a vehicle frame which is simple to operate.

Yet another objective of the invention is to provide a suspension system with an alignment mechanism which is of a simple construction, which achieves the stated objectives in a simple, effective and inexpensive manner, and which solves problems and satisfies needs existing in the art.

These and other objectives and advantages of the invention are obtained by the improved suspension systems, the general nature of which may be stated as including a pair of movable hanger brackets depending from the frame; a beam pivotally mounted to each movable hanger bracket; and alignment means for adjusting the position of each movable hanger bracket relative to the frame whereby the movable hanger bracket and pivotally mounted beam are movable between a first non-adjusted position and a second adjusted position.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 6 is an enlarged fragmentary sectional view, similar to FIG. 3 but shown in an aligned position;

FIG. 7 is an enlarged fragmentary sectional view similar to FIG. 3 of a second embodiment of the present invention;

FIG. 8 is an enlarged fragmentary sectional view similar to FIG. 3 of a third embodiment of the present invention; and FIG. 9 is an enlarged fragmentary sectional view similar to FIG. 3 of a fourth embodiment of the present invention.

Similar numerals refer to similar parts throughout the drawings.

DESCRIPTION OF THE PREFERRED EMBODIMENT

Figure 1:
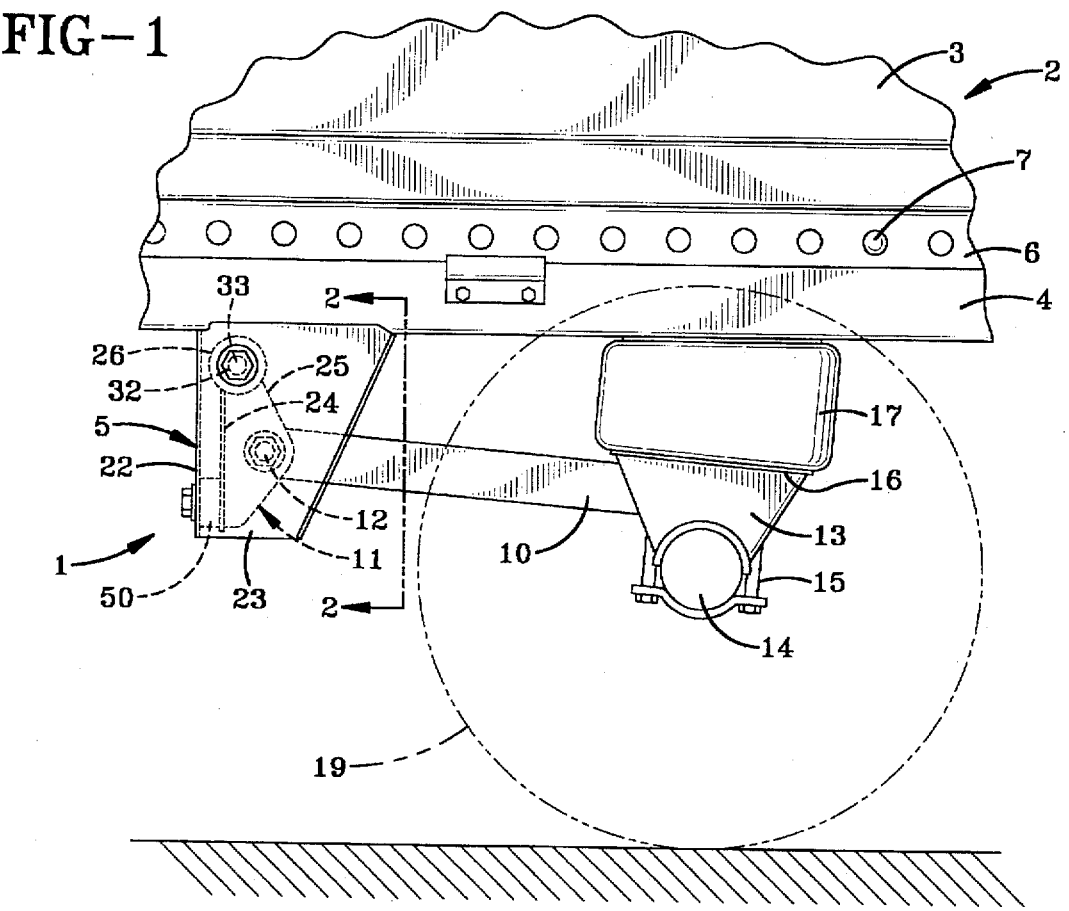
FIG. 1 is a fragmentary side elevational view of the suspension system attached to a vehicle and shown with the tire-wheel assembly in dot-dash line.

The improved suspension system of the present invention is indicated generally at 1, and is particularly shown in FIG. 1 mounted on a trailer 2. Trailer 2 includes a cargo box 3 supported by a pair of frame rails 4 (one shown) extending longitudinally under the length of trailer 2. Suspension system 1 includes a pair of stationary hanger brackets 5 welded to a pair of parallel and spaced apart slide channels 6. Slide channels 6 are spaced apart a distance equal to the distance between frame rails 4 and are mounted to frame rails 4 with a plurality of mounting pins 7. While FIG. 1 shows a single suspension system 1 installed on trailer 2, it is understood that multiple suspension systems 1 may be installed under trailer 2 without departing from the spirit of the present invention.

Figure 2:
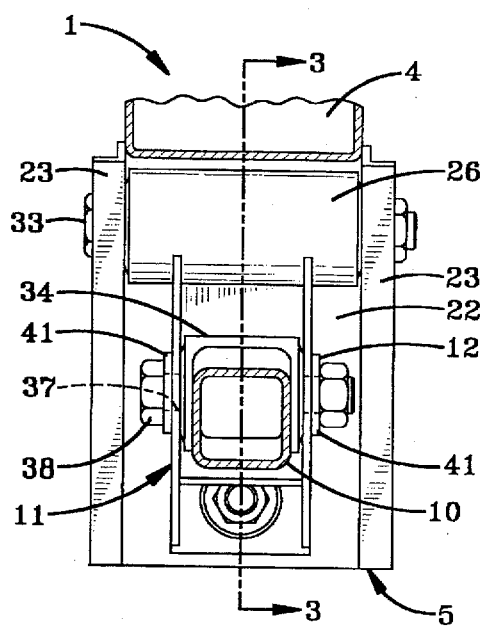
FIG. 2 is an enlarged fragmentary sectional view taken along line 2—2, FIG. 1.

Suspension system 1 includes a pair of parallel and spaced apart beams 10 (FIGS. 1 and 2). The first end of each beam 10 is mounted to a movable hanger bracket 11 at a pivot 12. An axle seat 13 is welded to a second end of each beam 10 for receiving an axle 14 which extends substantially perpendicular to beams 10. A U-bolt extends around each axle seat 13 and secures axle 14 to each beam 10. Each axle seat 13 is formed with an air spring mounting plate 16 whereby an air spring 17 is positioned intermediate each air spring mounting plate 16 and frame rails 4 for providing vertical load support for trailer 2. Axle 14 has a tire-wheel assembly 19 rotatably mounted on each end thereof.

Figure 3:
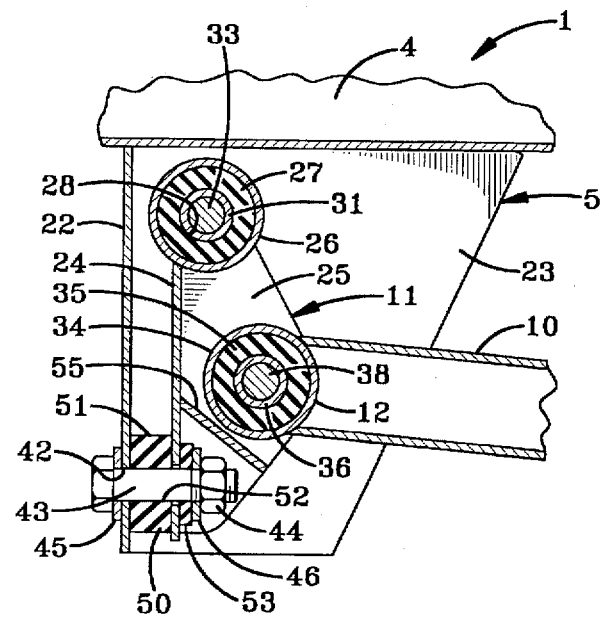
FIG. 3 is an enlarged fragmentary sectional view taken along line 3—3, FIG. 2.

In accordance with one of the main features of the present invention, and referring to FIGS. 1–3, each stationary hanger bracket 5 is formed with a forward compression plate 22, and a pair of parallel and spaced apart sidewalls 23 extending substantially perpendicular to compression plate 22. Similarly, each movable hanger bracket 11 is formed with an end plate 24, and a pair of parallel and spaced apart side plates 25 extending substantially perpendicular to end plate 24 and parallel to sidewalls 23 of stationary hanger brackets 5.

In accordance with another of the features of the present invention, each movable hanger bracket 11 is formed with a top end and a bottom end, and is positioned intermediate sidewalls 23 such that end plates 24 and compression plates 22 are substantially parallel and spaced apart. End plate 24 and side plate 25 of each movable hanger bracket 11 are welded to a cylindrical sleeve, 26 (FIG. 3). A rubber bushing 27 is press-fit into each sleeve 26. Rubber bushings 27 are formed with a hole 28. An inner metal sleeve 31 is bonded to each rubber bushing 27 in holes 28 and is somewhat longer than sleeves 26 and rubber bushings 27, for purposes which will be described in detail hereinbelow. Each sidewall 23 is formed with a hole 32 which is axially aligned with an inner sleeve 31 whereby holes 32 and inner sleeves 31 receive a pair of pivot pins 33. Movable hanger brackets 11 are thus pivotally mounted on pivot pins 33 relative to stationary hanger brackets 5.

As discussed generally above, each beam 10 is mounted to a movable hanger bracket 11 at a pivot 12. Specifically, one end of each beam 10 is welded to a sleeve 34 which extends intermediate side plates 25. Each mounting sleeve 34 receives a rubber bushing 35 which is bonded to a pivot sleeve 36. Side plates 25 are formed with holes 37 axially aligned with pivot sleeve 36. Holes 37 and pivot sleeve 36 receive a mounting bolt 38. Spacer washers 41 (FIG. 2) are inserted over mounting bolt 38 and adjacent each side plate 25 to prevent lateral movement of beams 10 relative to movable hanger brackets 11.

Compression plates 22 of stationary hanger brackets 5 and end plates 24 of movable hanger brackets 11 are formed with axially aligned holes 42 for receiving a compression bolt 43 and nut 44. A washer 45 is interposed intermediate compression plate 22 and compression bolt 43 and similarly, a washer 46 is interposed intermediate nut 44 and end plate 24.

In accordance with one of the main features of the present invention, a spring 50 is positioned intermediate each compression plate 22 and end plate 24 which spring 50 may take the form of a bellville spring, a coil spring, a leaf spring or a compressed bushing. While any of the above springs may be positioned intermediate compression plate 22 and end plate 24 without departing of the spirit of the present invention, the preferred embodiment utilizes a high durometer bushing 51 having a hole 52 is positioned intermediate each compression plate 22 and end plate 24 with a compression bolt 43 extending through each hole 52. Additionally, a plastic washer extends around compression bolt 43 adjacent end plate 24. While bushings 51 may have a variety of sizes and configurations, in the preferred embodiment bushings 51 are square and are formed with a surface area to be positioned adjacent end plate 24 and compression plate 22 in the range of from 6 square inches to 25 square inches. Similarly, bushings 51 may be formed from an elastomeric material, a fabric reinforced rubber or urethane having a durometer in the range of from 50 to 90 Share A hardness but the durometer of bushing 51 is preferably 65 Share A hardness. Preferably, bushings 51 have a maximum deflection in the range of from 0.75 inches to 1½ inches. As is apparent from a review of FIG. 3, when bushings 51 are manufactured of a lower durometer elastomeric material, they are somewhat larger to provide the necessary resistance as is described in detail hereinbelow. A gusset 55 extends intermediate side plates 25 and is welded to side plates 25 and end plate 24 to strengthen movable hanger brackets 11.

In operation, each movable hanger bracket 11 is rotatably supported on a pivot pin 33 with each inner sleeve 31 being clamped between sidewalls 23. Inasmuch as each inner sleeve 31 is clamped between sidewalls 23 and is longer than outer sleeve 26 and bushing 27, any lateral movement occurring between movable hanger bracket 11 and stationary hanger brackets 5 occurs as a result of lateral deflection of bushings 27 and is limited by the distance between sidewalls 23 and each outer sleeve 26. Similarly, rotational movement that occurs about pivot pins 33 is a result of radial deflection of elastomeric bushings 27.

Figure 4:
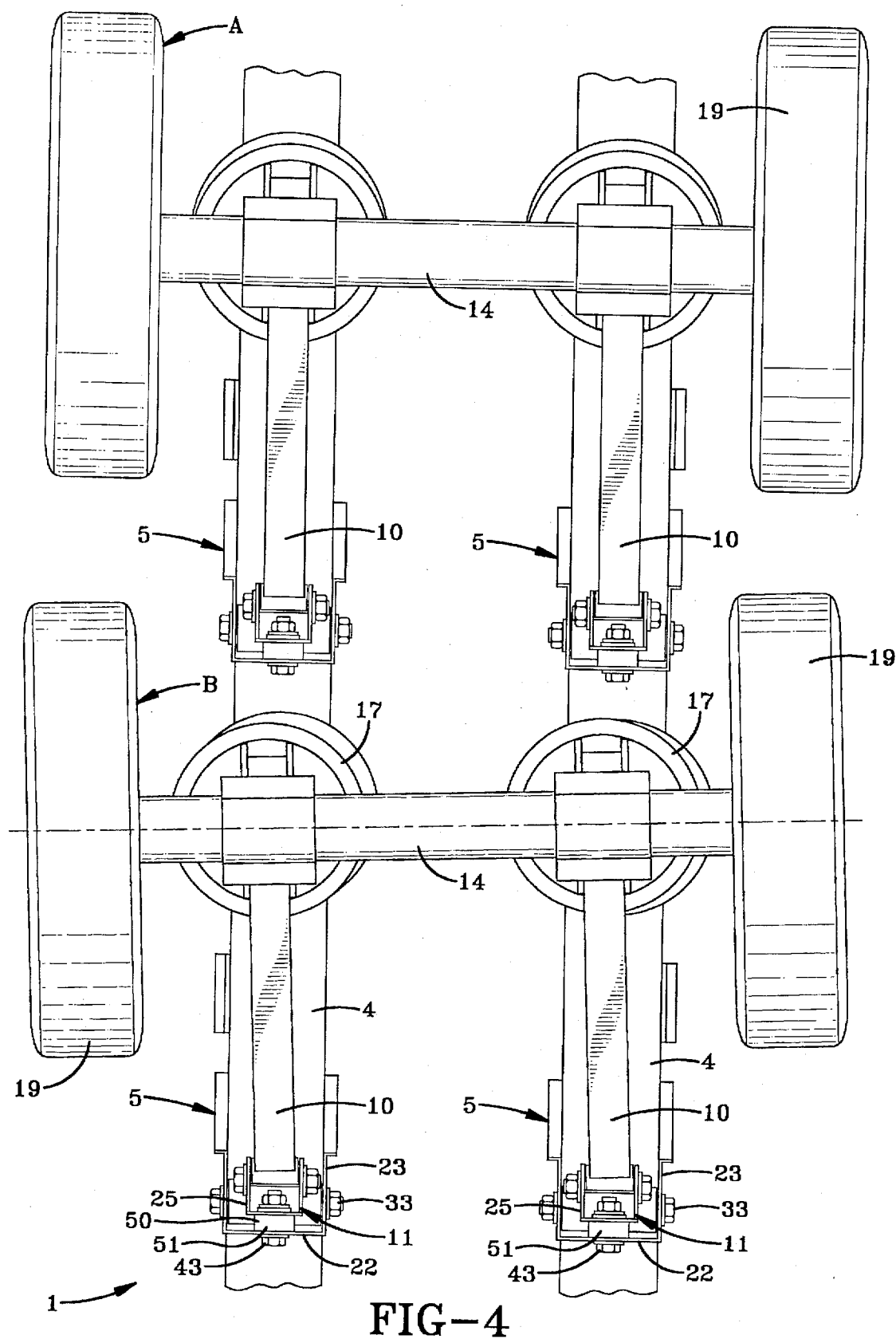
FIG. 4 is a bottom plan view of a pair of suspension systems shown installed on a pair of fragmentary trailer frame rails shown in fragmentary, and shown with one suspension system in a non-aligned position.

Referring then to FIG. 4, a first suspension A is shown which is substantially axially aligned with the path of travel of trailer 2. However, a second suspension B is shown to be out of alignment with suspension system A and with the path of travel of trailer 2. Suspension system B may be out of alignment for a number of reasons. Suspension system B may have been incorrectly mounted to trailer 2, or alternatively due to manufacturing tolerances, suspension system B may have been manufactured such that if correctly mounted on trailer 2, it will remain out of alignment with other suspensions on trailer 2, and with the path of travel thereof. As can be seen from a review of FIG. 4, if trailer 2 is utilized with suspensions A and B as presently mounted, suspension system B will drag over the road surface, thus causing extensive tire wear, and possibly overstressing suspension components causing breakage.

Figure 5:
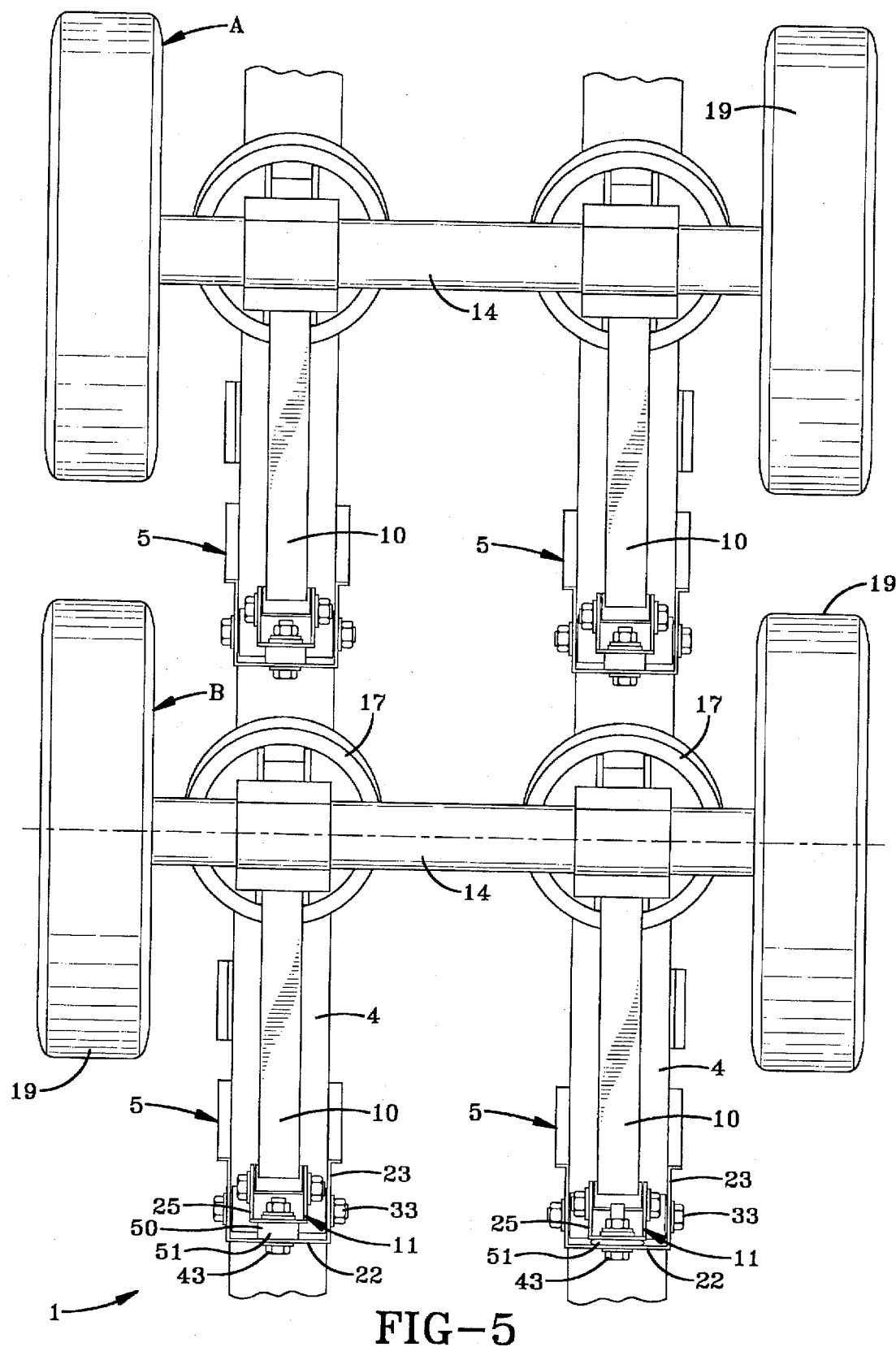
FIG. 5 is a bottom plan view of a pair of suspension systems shown installed on a pair of trailer frame rails similar to FIG. 4, and shown with both suspension systems in an aligned position.

Suspension system B may be brought into alignment with suspension system A by threading nut 44 onto compression bolt 43 thereby compressing elastomeric bushing 51. By compressing bushing 51, movable hanger bracket 11 will move from the position shown in FIGS. 3 and 4 to the position shown in FIGS. 5 and 6. The affected movable hanger bracket 11 will rotate about pivot pin 33 thus moving end plate 24 closer to compression plate 22. As elastomeric bushing 51 is compressed, interconnected beam 10 will be drawn toward compression plate 22 thus moving suspension system B from the position shown in FIG. 4 to the position shown in FIG. 5 and bringing suspension system B into alignment with suspension system A thereby substantially decreasing tire wear and removing significant stress from suspension components.

Bushing 51 is compressed intermediate end plate 24 of movable hanger bracket 11 and compression plate 25 of stationary hanger bracket 5. Bushing 51 thus must be manufactured of material of sufficient strength to apply an equal and opposite expansion force without deflection. Essentially, bushing 51 must be compressed via the threaded engagement of nut 44 on compression bolt 43 with a compressive force greater than the largest longitudinal load exerted on bushing 51. Longitudinal loads are exerted on bushing 51 when, for example, the tire-wheel assembly 19 strikes a curb, engages the edge of a pothole, or when brakes are applied to the trailer. In all these situations, a longitudinal load is transferred from the tire-wheel assemblies 19 through U-bolts 15 and axle seats 13 into beams 10. This force is transferred from beams 10 to movable hanger brackets 11, and consequentially acts upon elastomeric bushings 51. As such, the longitudinal forces acting through beams 10 are the primary forces which act upon bushings 51. Forces acting upon elastomeric bushings 51 are in the range of from 6,000 pounds to 10,000 pounds. To assure that bushing 51 will not deflect as a result of longitudinal forces acting through suspension system 1, bushings 51 are compressed such that the responding force is greater than 10,000 pounds, or greater than the maximum force felt by the suspension system as a result of longitudinal forces acting through beams 10 and movable hanger brackets 11.

Once bushing 51 is compressed, for example when in the position shown in FIG. 6, compressive forces acting on bushing 51 are extremely high when compared to the longitudinal forces acting on the bushing as a result of trailer travel such that such longitudinal forces, even at maximum are insufficient to deflect bushing 51. Bushing 51 thus is essentially a solid, non-flexible element of suspension system 1.

As can be seen from a review of FIG. 6, pivot 12 is positioned intermediate pivot pin 33 and compression bolt 43. As a result, bushings 51 will deflect a greater distance than the axial displacement of associated beam 10 as beam 10 is attached to movable hanger bracket 11 adjacent pivot pin 33 such that beam 10 travels through a smaller arc, and thus a shorter linear distance than that portion of movable hanger bracket 11 adjacent bushing 51.

Referring to a second embodiment of the present invention indicated generally at 58 in FIG. 7, a pair of movable hanger brackets 54 are mounted to a pair of stationary hanger brackets 57 on a pair of pivot pins 56 adjacent the top of hanger brackets 54. Each beam 10 is mounted to a movable hanger bracket 54 in a manner substantially identical to the first embodiment of the present invention adjacent the bottom end of each movable hanger bracket 54. However, compression bolts 43 and bushings 51 are positioned intermediate each beam 10 and pivot pin 56. Bushings 51 thus deflects less than the longitudinal displacement of beams 10 relative to stationary hanger brackets 57 as beams 10 rotate about pivot pins 56 through a lever arm longer than the lever arm which acts upon bushing 51.

A third embodiment of the suspension system of the present invention is indicated generally at 60 and is shown particularly in FIG. 8. Suspension system 60 is substantially identical to suspension systems 1 and 58 of the first and second embodiments of the present invention, and includes a pair of pivot pins 61 similar to pivot pins 33, a pair of compression bolts 43, a pair of nuts 44 and a pair of bushings 51. Suspension system 60 further includes a pair of movable hanger brackets 64 and a pair of stationary hanger brackets 65, as well as a pair of pivot pins 61. Suspension system 60 differs from suspension system 1 only in that suspension system 60 provides that bushings 51 are mounted adjacent the top end of each movable hanger bracket 64 while suspension system 1 provides that bushings 51 are mounted adjacent the bottom end of movable hanger brackets 11.

A fourth embodiment of the present invention (FIG. 9) is indicated generally at 70 and includes compression bolts 43, bushings 51, beams 10, a pair of movable hanger brackets 74, and a pair of stationary hanger brackets 75, each formed with a compression plate 76. Additionally, a pivot pin 77 pivotally attaches each movable hanger bracket 74 to each stationary hanger bracket 75. Suspension system 70 is substantially similar to suspension system 60, 58 and 1 except that each pivot pin 77 is positioned intermediate beam 10 and compression bolt 43 such that when each flexible bushing 51 is compressed, the upper portion of movable hanger bracket 74 is moved toward compression plate 76 of stationary hanger bracket 75, while beam 10 is moved away from compression plate 76 of hanger bracket 75.

As is appreciated from a review of FIGS. 6–9, all four embodiments of the present invention operate similarly, with the position of the pivot pin, beam and flexible bushing operating to increase or decrease the longitudinal movement of the beam relative to a bushing deflection.

In summary, the present invention provides a suspension system having an alignment mechanism which utilizes a flexible bushing compressed with a force substantially higher than the largest longitudinal force experienced by the bushing. This bushing may be further compressed or relaxed to reposition the axle, and interconnected tire-wheel assemblies to assure that the same are aligned with the trailer's path of travel to prevent tire scuffing and to substantially increase the life of suspension components. Additionally, the compression bolt may be periodically adjusted without the need for complicated alignment procedures to assure that as suspension components wear, suspension system 1 may remain aligned with the path of travel of trailer 2.

Accordingly, the improved vehicle suspension system with alignment is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle suspension system with alignment is constructed and used, the characteristics of the construction, and the advantageous, new and useful results obtained; the new and useful structures, devices, elements, arrangements, parts and combinations, are set forth in the appended claims.

I claim:

1. A suspension system for mounting to a vehicle frame comprising:
   a pair of movable hanger brackets depending from the frame;
   a beam pivotally mounted to each movable hanger bracket; and
   alignment means for adjusting the position of each movable hanger bracket relative to the frame whereby the movable hanger bracket and pivotally mounted beam are movable between a first non-adjusted position and a second adjusted position.

2. The suspension system as defined in claim 1 in which the alignment means includes a spring means extending intermediate the frame and the movable hanger bracket for providing pressure against the movable hanger bracket; and compression means for applying a compressive force to the spring means.

3. The suspension system as defined in claim 2 in which the beam has a longitudinal axis, and in which the spring means is compressed in both the first non-adjusted position and the second adjusted position with a force greater than that experienced along the longitudinal axis of the beam.

4. The suspension system as defined in claim 3 in which the compression means is a bolt and a nut threadably engaging said bolt.

5. The suspension system as defined in claim 4 in which a plastic washer is interposed intermediate the nut and the movable hanger bracket.

6. The suspension system as defined in claim 4 in which the spring means is formed with a hole; and in which the bolt passes through said hole.

7. The suspension system as defined in claim 2 in which a pivot pin extends through each movable hanger bracket and the frame for pivotally mounting said movable hanger bracket to the frame.

8. The suspension system as defined in claim 7 in which an elastomeric bushing extends circumferentially around the pivot pin; and in which an outer sleeve is attached to the movable hanger bracket for receiving the elastomeric bushing and pivot pin.

9. The suspension system as defined in claim 7 in which the movable hanger bracket is formed with an end plate; and in which the spring means is interposed between the end plate and the frame.

10. The suspension system as defined in claim 9 in which a pair of side plates extend outwardly from the end plate, and in which the beam is mounted to the movable hanger bracket intermediate the side plates.

11. The suspension system as defined in claim 7 in which the movable hanger bracket has a top end and a bottom end, in which the pivot pin extends through the movable hanger bracket adjacent one of the top end and bottom end of the hanger bracket; in which the beam is mounted to the hanger bracket adjacent the other of the top end and bottom end; and in which the adjustment means is mounted to the movable hanger bracket intermediate the pivot pin and beam.

12. The suspension system as defined in claim 7 in which the movable hanger bracket has a top end and a bottom end; in which the adjustment means is mounted to the hanger bracket adjacent one of the top end and the bottom end; in which the pivot pin passes through the movable hanger bracket adjacent the other of the top end and bottom end; and in which the beam is mounted to the movable hanger bracket intermediate the adjustment means and the pivot pin.

13. The suspension system as defined in claim 7 in which the movable hanger bracket has a top end and a bottom end; in which the pivot pin passes through the movable hanger bracket intermediate the top end and the bottom end; in which the adjustment means is mounted to the hanger bracket adjacent one of the top end and the bottom end; and in which the beam is mounted to the hanger bracket adjacent the other of the top end and the bottom end.

14. The suspension system as defined in claim 3 in which the spring means may be compressed in the range of from 1½ inches to 0.75 inches.

15. The suspension system as defined in claim 14 in which the spring means is a compressible bushing.

16. The suspension system as defined in claim 15 in which the bushing has a durometer in the range of from 50 to 90 scale A hardness.

17. The suspension system as defined in claim 7 in which the pivot pin has a longitudinal axis; in which the compression means has a longitudinal axis; and in which the longitudinal axis of the pivot pin and the longitudinal axis of the compression means are substantially perpendicular.

18. In combination, a vehicle frame, and a suspension system for mounting to the vehicle frame to a vehicle comprising:

a pair of stationary hanger brackets depending from the frame;

a pair of movable hanger brackets depending from the stationary hanger brackets;

a beam pivotally mounted to each movable hanger bracket; and adjustment means for adjusting the position of each movable hanger bracket relative to the frame whereby the movable hanger bracket and pivotally mounted beam may be moved between a first non-adjusted position and a second adjusted position.

19. The suspension system as defined in claim 18 in which each stationary hanger bracket is formed with a compression plate; in which the adjustment means includes a spring means extending intermediate the compression plate of the frame and movable hanger bracket; and in which compression means for applying a compressive force to said spring means extends between the compression plate and movable hanger bracket.

20. The suspension system as defined in claim 19 in which each stationary hanger bracket is formed with a pair of sidewalls; and in which one movable hanger bracket is mounted intermediate the sidewalls of each stationary hanger bracket.

21. The suspension system as defined in claim 20 in which a pivot pin extends through the sidewalls of each stationary hanger bracket and movable hanger bracket for pivotally mounting one movable hanger bracket to each stationary hanger bracket.

* * * * *